(12) United States Patent
Paganelli et al.

(10) Patent No.: US 11,664,511 B2
(45) Date of Patent: *May 30, 2023

(54) METHOD FOR CONTROLLING A FUEL CELL

(71) Applicant: Symbio, Fontaine (FR)

(72) Inventors: Gino Paganelli, Cottens (CH); Lionel Jeanrichard-dit-Bressel, Formangueires (CH)

(73) Assignee: Symbio, Fontaine (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/245,550

(22) Filed: Apr. 30, 2021

(65) Prior Publication Data

US 2021/0344023 A1  Nov. 4, 2021

(30) Foreign Application Priority Data

Apr. 30, 2020 (FR) ...................................... 2004318

(51) Int. Cl.
*H01M 8/04119* (2016.01)
*H01M 8/04089* (2016.01)
*H01M 8/0438* (2016.01)
*H01M 8/04746* (2016.01)
*H01M 8/1004* (2016.01)

(52) U.S. Cl.
CPC ... *H01M 8/04179* (2013.01); *H01M 8/04104* (2013.01); *H01M 8/04432* (2013.01); *H01M 8/04746* (2013.01); *H01M 8/1004* (2013.01)

(58) Field of Classification Search
CPC ......... H01M 8/04104; H01M 8/04179; H01M 8/04388; H01M 8/04671; H01M 8/04746; H01M 8/1004
See application file for complete search history.

(56) References Cited

U.S. PATENT DOCUMENTS

| 11,177,488 B2* | 11/2021 | Paganelli ......... H01M 8/04231 |
| 2013/0149620 A1* | 6/2013 | Fabian ............. H01M 8/04208 |
| | | 429/443 |
| 2017/0294665 A1* | 10/2017 | Ok .................... H01M 8/04089 |

(Continued)

FOREIGN PATENT DOCUMENTS

| JP | 2007080753 A | 3/2007 |
| JP | 2007184136 A | 7/2007 |

(Continued)

OTHER PUBLICATIONS

English translation of KR Publication 2015-0077926, Jul. 2015.*

*Primary Examiner* — Brittany L Raymond
(74) *Attorney, Agent, or Firm* — Thompson Coburn LLP; Steven M. Ritchey

(57) ABSTRACT

A method for purging the hydrogen feed anode circuit of a fuel cell, whereby hydrogen is fed at a nominal pressure to the inlet of the cell, characterized in that at predetermined periodicity the following steps are repeated: instruction is given to open the hydrogen purge valve arranged on the outlet of the anode circuit; the pressure of hydrogen is measured at the inlet to the anode circuit of the cell, and the measured value is compared with a predetermined threshold pressure value; and the purge valve is closed when the measured pressure is equal to or lower than the predetermined threshold pressure value.

10 Claims, 2 Drawing Sheets

(56) References Cited

U.S. PATENT DOCUMENTS

2018/0294497 A1 10/2018 Asai
2020/0144642 A1  5/2020 Kwon et al.

FOREIGN PATENT DOCUMENTS

| JP | 2008204957 A | | 9/2008 |
|----|----|----|----|
| JP | 2011216341 A | | 10/2011 |
| JP | 2018-205180 | * | 12/2018 |
| JP | 2018205180 A | | 12/2018 |
| JP | 2020021533 A | | 2/2020 |
| KR | 2015-0077926 | * | 7/2015 |

* cited by examiner

METHOD FOR CONTROLLING A FUEL CELL

CROSS-REFERENCE TO RELATED APPLICATIONS

This application claims the benefit of FR 2004318 filed on Apr. 30, 2020, which is incorporated herein by reference in its entirety.

TECHNICAL FIELD AND STATE OF THE PRIOR ART

The present invention relates to fuel cells, in particular to polymer membrane fuel cells fed with hydrogen, and concerns a method for controlling a fuel cell allowing to purge the gases and water accumulated at the anode of the cell.

Fuel cells are used as power source in various applications, in particular in electric vehicles. In fuel cells of proton-exchange membrane type (PEMFC), hydrogen is used as fuel which is fed to the anode of the fuel cell, whereas the cathode is fed with oxygen as oxidizer. Proton-exchange membrane fuel cells (PEMFC) comprise a Membrane Electrode Assembly (MEA) comprising an electrolytic proton-exchange membrane in solid polymer that is electrically non-conductive, having the anodic catalyst on one of the sides thereof and the cathodic catalyst on the opposite side. A membrane electrode assembly (MEA) is sandwiched between a pair of electrically conductive elements, or bipolar plates, by means of gas diffusion layers, these layers being formed of carbon cloth for example. The bipolar plates are generally rigid and thermally conductive. They chiefly act as current collectors for the anode and cathode and comprise channels provided with suitable openings to distribute the gaseous reactants of the fuel cell over the surfaces of the respective anodic and cathodic catalysts, and to evacuate the water produced at the cathode. A cell of a fuel cell is therefore formed by a MEA, including the gas diffusion layers and two monopolar plates.

A fuel cell may comprise a single cell or a plurality of cells in the form of a stack. A stack is therefore composed of several individual cells connected in series.

When in operation, an electrical voltage is produced at the terminals of the cells further to an electrochemical oxidizing reaction of hydrogen at the anode and an electrochemical oxygen-reducing reaction at the cathode. The resultants of these reactions are the production of electricity at the terminals of the electrodes, and of water and heat at the cathode of the cell. It has additionally been ascertained that residual water and residual gases accumulate at the anode of the cell, and that these must be evacuated to ensure proper operation of the fuel cell.

In the prior art, solutions are known relating to the use of a purge valve installed on the hydrogen feed circuit of the cell, this valve being controlled to obtain regular, continuous or discontinuous purging of the feed circuit for removal into the atmosphere of residual impurities contained in the feed gas and water present in the anode channels. To prevent risks related to the onset of irreversible damage in the cell in the event of insufficient purging, purges are often carried more than is necessary, in particular if there is abundant presence of liquid water at the anode. Yet, such practice generates a considerable loss of hydrogen and also carries the risk of breaching regulatory and safety restrictions on account of the amount of pure hydrogen that is released.

Document WO 2018/115630 describes a solution to overcome this problem whereby the purge valve is connected to a receptacle for receiving purged hydrogen. The valve and receptacle are installed on the anode outlet of the fuel cell, and the purged hydrogen contained in the receptacle is redirected towards the anode inlet of the fuel cell. Therefore, part of the purged hydrogen is certainly recovered, but at the cost of an additional tank and without being able to adapt purge frequency or purge time to the operating conditions of the cell.

Another solution was proposed in document US 2015/0280260 which describes a method for controlling the hydrogen purge valve of the feed circuit of a fuel cell, to evacuate liquid water from the anode circuit whilst guaranteeing a predetermined hydrogen concentration. The device described in this document therefore comprises a control unit and means allowing an estimation of the amount of accumulated water to determine the time at which the purge valve is to be opened. The length of valve opening time is also determined by the control unit on the basis of an estimation of changes in hydrogen concentration. Ensuring more accuracy than preceding solutions under normal operation conditions, this solution is based on computation formulas taking into account different parameters and constants. It therefore requires numerous sensors and a reaction loop which entails some delay. Also said method is insufficiently reliable in the event of perturbations, for example under transient or non-stabilized operation of the cell.

SUMMARY OF THE INVENTION

It is one objective of the invention to overcome at least some of disadvantages of the aforementioned documents and to propose a robust, reliable solution allowing the frequency and time length of purges to be adapted to the amount of water present at the anode, irrespective of the operating conditions of the cell.

This object of the invention is reached with a method for purging the hydrogen feed anode circuit of a fuel cell, whereby hydrogen is fed at a nominal pressure ($P_{nom}$) to the inlet of the cell, characterized in that at predetermined periodicity the following steps are repeated:
- instruction is given to open the hydrogen purge valve arranged on the outlet of the anode circuit;
- the pressure of hydrogen is measured at the inlet to the anode circuit of the cell, and the measured value is compared with a predetermined threshold pressure value ($P_{low}$); and
- the purge valve is closed when the measured pressure is equal to or lower than the predetermined threshold pressure value ($P_{low}$).

In a proton-exchange membrane fuel cell, water is produced at the cathode. However due to the permeability of the membrane, some of the water produced at the cathode towards the anode through the proton-exchange membrane. In the method of the invention, the purge valve is opened to evacuate the liquid water present at the anode and gases, while at the same time monitoring the pressure values at the input of the purge valve. In the invention, the purge valve remains open until a low limit of measured pressure is reached. As a result, the opening time of the purge valve is adapted to the amount of water present at the anode. Since liquid water is more viscous than the gas, in this case hydrogen, the greater the amount of water at the anode the longer the time needed to reach the low pressure value $P_{low}$, and hence the longer the purge valve must remain open. Therefore, purge time is automatically adapted as a function of the amount of water at the anode, so that only strictly necessary purging is applied irrespective of conditions and using a single sensor i.e. the sensor measuring hydrogen pressure at the inlet to the cell. According to the method of the invention, the opening time of the purge valve can be measured and said periodicity can be adapted as a function of the measured time. As explained above, the purge time is automatically extended in the event of water at the anode to compensate for the length of time during which the valve evacuates water and not gas. Therefore, the opening time of the purge valve is proportional with the amount of liquid water present at the anode of the cell. On this account, the more this time length is extended the shorter the intervals between purge operations so that it is possible to adapt the periodicity of purging to the opening time of the purge valve and to evacuate all excess water efficiently at the anode.

Feeding of hydrogen to the cell can be obtained from a tank by means of a proportional solenoid valve driven by a pressure regulator connected to a pressure sensor. This allows precise adjustment of feed pressure to the fuel cell, the pressure regulator being connected to a pressure sensor positioned at the inlet to the cell to control opening of the solenoid valve.

Said pressure regulator can be deactivated during the opening time of the purge valve. The purpose is to prevent counter-reaction of the proportional solenoid valve from perturbing pressure change during purging. The regulator is reactivated immediately after closing of the purge valve.

According to the method of the invention, the $P_{low}$ pressure values can be between 70 and 95% of $P_{nom}$. During laboratory tests it was found that with this range of pressure values it is possible to obtain proper purging of a fuel cell under all operating conditions thereof. The value $P_{low}$ can be constant or can be adapted to operating conditions, for example as a function of the current produced by the fuel cell.

The values of pressure $P_{nom}$ can be between 1.2 and 2 bar.

Said periodicity can be between 2 s and 20 s for an opening time of the purge valve of possibly between 500 ms and 100 ms. Therefore, for a long opening time, the intervals between purges are shorter and increase when the opening time of the purge valve is decreased at a previous purge.

In the method of the invention, when the purge valve is opened, the time can be measured after which the value of pressure $P_{low}$ is reached starting from the value $P_{nom}$, and it is compared to a predefined maximum opening time of the purge valve. If the measured time exceeds the maximum time, it is possible to identify a situation in which the purge valve is jammed in the closed position.

It is also possible, when the purge valve is closed, to measure the time after which the value of pressure $P_{nom}$ is reached starting from the value of pressure $P_{low}$, and to compare this with a predefined time. If the measured time exceeds this predefined time (it is inferred that the pressure does not reach the value $P_{nom}$), it is inferred that the purge valve is jammed in the open position.

The objective of the invention is also reached with a device for implementing the method of the invention, which comprises a purge valve, a pressure sensor and a control unit of a fuel cell.

A further objective of the invention is the use of the device for implementing the method of the invention in a fuel cell.

BRIEF DESCRIPTION OF THE FIGURES

The invention will be better understood on reading the remainder of the description given in connection with the following figures.

In the different figures, same or similar elements carry the same reference. The description thereof is therefore not systematically reproduced.

DETAILED DESCRIPTION OF PARTICULAR EMBODIMENTS

Figure 1:
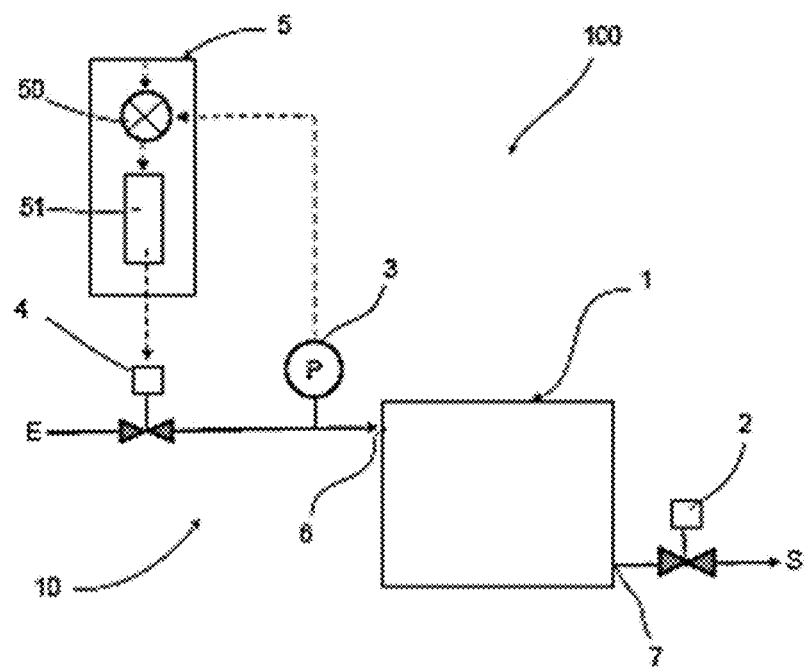
FIG. 1 is a schematic view of the device for implementing the method of the invention.

FIG. 1 schematically illustrates a device 100 for implementing the method of the invention, installed on the anode circuit 10 of a fuel cell 1. More specifically, FIG. 1 illustrates the topology of the anode circuit 10 of the cell between an inlet E for hydrogen, derived for example from a pressurized hydrogen tank (not illustrated) and an outlet S of the cell under atmospheric pressure. The fuel cell 1 is fed with hydrogen via a proportional solenoid valve 4. This solenoid valve is driven by a regulator 5 to maintain the pressure at the inlet 6 to the cell at a predetermined value. For this purpose, a pressure sensor 3 is installed on the anode circuit just before the hydrogen inlet 6 into the fuel cell 1, and it is connected to the input of the regulator 5. The regulator 5 is of the type generally known and operates by means of a pseudo-analogue signal of Pulse Width Modulation (PWM). More specifically, the measurement signal sent by the sensor 3 arrives at a comparator 50 of the regulator which receives a set value. The output value of the comparator 50 is transmitted to a control unit 51 of the regulator which actuates the proportional solenoid valve 4. The set pressure value $P_{nom}$ is generated by the fuel cell controller (or control unit). It can be constant or adapted to operating conditions, for example as a function of the current produced by the fuel cell.

As can be seen in FIG. 1, on the anode circuit 10 after the cell outlet 7, there is arranged a purge solenoid valve 2 of «On/Off» type driven by a control unit of the cell (not illustrated). The purge 2 is preferably positioned at a low point of the outlet collector of the anode circuit so that it is able to drain the liquid water.

In one variant, not illustrated, means are added to the anode circuit 10 for the recirculation of hydrogen, for example comprising a Venturi ejector arranged between the proportional valve 4 and the pressure sensor 3, so as to recirculate part of the gas at the outlet 7 before the purge valve 2.

Figure 2:
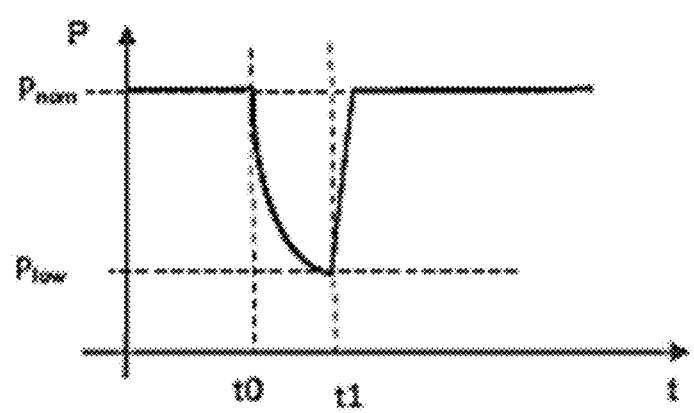
FIG. 2 is a graph illustrating changes in pressure as a function of time.

FIG. 2 is a graph illustrating the principle for measuring the opening time of the purge valve 2, the time values in seconds being given along the X-axis and the pressure values in bars along the Y-axis. Anodic pressure at the inlet 6 to the cell is regulated at a set value $P_{nom}$ via the proportional valve 4 and the regulator 5. The cell control unit controls opening of the purge valve 2. As soon as the purge valve is opened at time t0, a rapid decrease is observed in hydrogen pressure measured by the pressure sensor 3. When the pressure reaches the threshold $P_{low}$, the purge valve 2 is closed. The opening time T of the purge valve, equaling t1-t0, is used by the computer as indicator of the presence of water at the anode. It is observed that the greater the amount of liquid water at the anode outlet the longer the time needed to reach pressure $P_{low}$ due to the very high viscosity or density of water and the time it takes to escape via the purge valve, compared with the situation in which only gas needs to be evacuated by this same purge valve. During the opening time of the purge valve 2, the instruction given by the pressure regulator 5 remains fixed at the value at the instant preceding the purge so that counter-reaction of the proportional valve 4 does not perturb pressure change during the purge. Immediately after the purge, the pressure regulator is released and again activates the proportional valve 4 for return to the target pressure $P_{nom}$.

The purge time T is therefore automatically adapted to the amount of liquid water at the anode. The more water there is, the longer the time needed to reach pressure $P_{low}$. The purge time will be automatically lengthened in the event of the presence of water, to tend towards compensating for the purge time during which the purge valve 2 was employed for the evacuation of water and not gas. In addition to this automatic adapting of purge time, in the event of the presence of water, the time or period between two successive purges is also reduced for better compensation.

Figure 3:
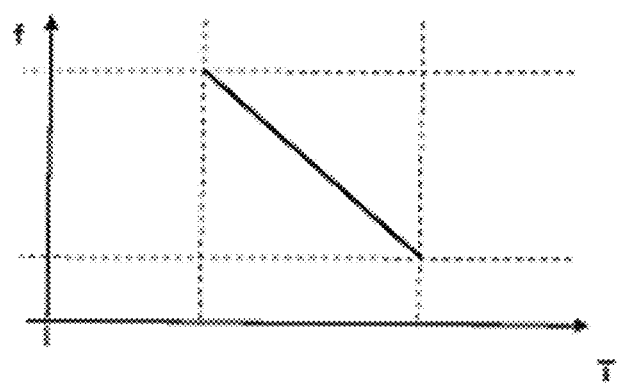
FIG. 3 is a graph illustrating the relationship between opening time of the purge valve and periodicity of purges.

FIG. 3 shows the relationship between the purge time T in seconds measured by the control unit of the cell and periodicity fin seconds applied between purges. It can be seen that the longer the purge time revealing the presence of increasing amounts of water, the shorter the intervals between successive purges to promote the evacuation of excess water and to ensure sufficient purging despite the presence of water. This mapping is predetermined by means of prior fine-tuned calibration to guarantee that the liquid water at the anode is sufficiently drained to prevent degradation of the cell, but without causing excess evacuation to prevent hydrogen wastage, under all the operating conditions of the fuel cell.

For example, the periodicity of purges may vary from 2 s to 20 s for an opening time respectively varying from 500 ms to 100 ms. The first purge is triggered by the control unit of the cell after a pre-set operating time, for example after a cell operating time of a few seconds. An output value (opening time of the purge valve) is then used to determine the periodicity of the following purges.

In one variant, a minimum opening time and a maximum opening time of the purge valve 2 can be defined, and these values can be stored in the memory of the cell control unit to detect faults (jamming of the purge valve 2 in the open or closed position, or a possible anomaly on the hydrogen circuit).

Alternatively, the coherency of pressure changes can be monitored at the inlet to the anode circuit. To detect jamming of the purge valve in the closed position, it can be verified whether or not the pressure value $P_{low}$ is reached after the maximum opening time. To detect jamming of the purge valve in the open position, the return to pressure $P_{nom}$ can be verified after closing the purge valve. Therefore, if during operation, the time measured to reach the pressure value $P_{low}$ after opening of the purge valve instructed by the control unit exceeds a pre-set maximum value, it can be inferred that there is jamming of the purge valve in the closed position. If the control unit gives instruction for closing of the purge valve starting from $P_{low}$ and the measured pressure does not reach $P_{nom}$ sufficiently quickly, within a pre-set time interval, it can be inferred that there is jamming of the purge valve in the open position. In this case, the control unit can display error messages corresponding to the detected anomaly.

What is claimed is:

1. A method for purging a hydrogen feed anode circuit of a fuel cell, whereby hydrogen is fed at a nominal pressure to an inlet of the fuel cell, the method comprising repeating the following steps at a predetermined periodicity:
   instruction is given to open a hydrogen purge valve arranged on the the hydrogen feed anode circuit after an outlet of the fuel cell;
   the pressure of hydrogen is measured at the inlet of the fuel cell with a pressure sensor on the hydrogen feed anode circuit just before the inlet of the fuel cell, and the measured value is compared with a predetermined threshold pressure value; and
   the hydrogen purge valve is closed when the measured pressure is equal to or lower than the predetermined threshold pressure value.

2. The method according to claim 1, further comprising measuring an opening time of the hydrogen purge valve and adapting said predetermined periodicity as a function of the measured opening time of the hydrogen purge valve during a previous purge.

3. The method according to claim 1, wherein feeding of hydrogen to the fuel cell is obtained from a tank by means of a proportional solenoid valve driven by a pressure regulator connected to the pressure sensor.

4. The method according to claim 3, wherein said pressure regulator is deactivated during an opening time of the hydrogen purge valve.

5. The method according to claim 1, wherein the predetermined threshold pressure value is between 70 and 95% of the nominal pressure.

6. The method according to claim 1, wherein the nominal pressure value is between 1.5 and 2 bars.

7. The method according to claim 1, wherein said predetermined periodicity is between 2 s and 20 s for an opening time of the hydrogen purge valve of between 500 ms and 100 ms.

8. The method according to claim 1, wherein, when the hydrogen purge valve is opened, the time is measured after which the predetermined threshold pressure value is reached starting from the nominal pressure, said measured time is compared with a maximum value, and it is inferred that the hydrogen purge valve is jammed in the closed position if said measured time exceeds said maximum value.

9. The method according to claim 1, wherein, when the hydrogen purge valve is closed, the time is measured after which the nominal pressure is reached starting from the predetermined threshold pressure value, said measured time is compared with a time interval, and it is inferred that the hydrogen purge valve is jammed in the open position if said measured time exceeds said time interval.

10. A device comprising a hydrogen purge valve, a pressure sensor, and an electronic control unit of a fuel cell, wherein the electronic control unit is configured for implementing the method of claim 1.

* * * * *